United States Patent [19]
Yamaguchi

[11] 3,808,907
[45] May 7, 1974

[54] SHIFT LEVER DEVICE FOR SPEED CHANGE GEAR TRANSMISSION TRAIN OF A BICYCLE

[76] Inventor: Eikichi Yamaguchi, 3-14-2 Nakamegun, Meguro-ku, Tokyo, Japan

[22] Filed: June 9, 1972

[21] Appl. No.: 261,296

[52] U.S. Cl............ 74/471 XY, 74/501 R, 74/217 B
[51] Int. Cl................................................ G05g 9/02
[58] Field of Search......... 74/47 XY, 473 R, 501 R, 74/491, 271 B

[56] References Cited
UNITED STATES PATENTS

| | | | |
|---|---|---|---|
| 3,172,300 | 3/1965 | Schneider | 74/471 XY |
| 3,323,607 | 6/1967 | Futamata | 74/471 XY X |
| 3,383,940 | 5/1968 | Brilando et al. | 74/501 |
| 3,517,568 | 6/1970 | Payerle | 74/471 XY |

FOREIGN PATENTS OR APPLICATIONS

| | | | |
|---|---|---|---|
| 644,255 | 4/1937 | Germany | 74/471 XY |

Primary Examiner—Allan D. Herrmann
Attorney, Agent, or Firm—McGlew and Tuttle

[57] ABSTRACT

A shift lever is mounted on the bicycle frame for pivoting about a first axis and for angular displacement about a second axis perpendicular to the first axis. A first speed changing cable connects the shift lever to the first train, and a second speed changing cable is connected to a member displaceable by angular displacement of the shift lever. The first cable is connected to an end of the shift lever so that it is displaced linearly upon pivoting of the shift lever about the first axis. Angular displacement of the shift lever effects rotation of a drum or gear which, in turn, effects linear displacement of the second cable. Conjoint pivoting of the shift lever and angular displacement thereof effects simultaneous linear displacement of both speed changing cables.

4 Claims, 13 Drawing Figures

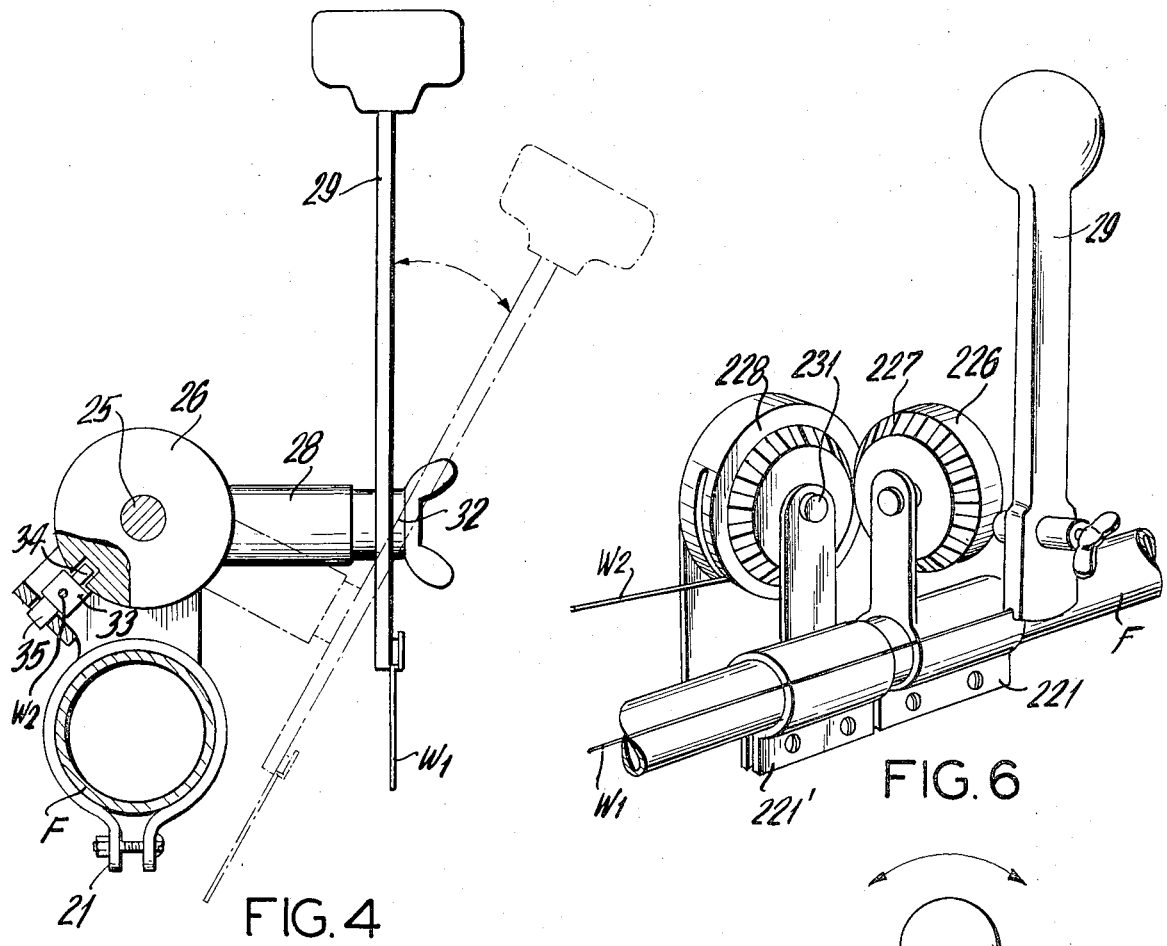
FIG. 4
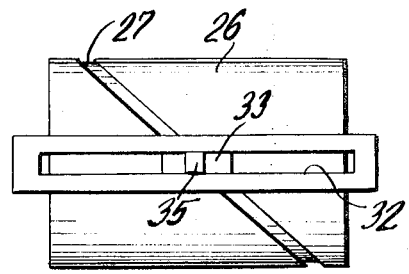
FIG. 5
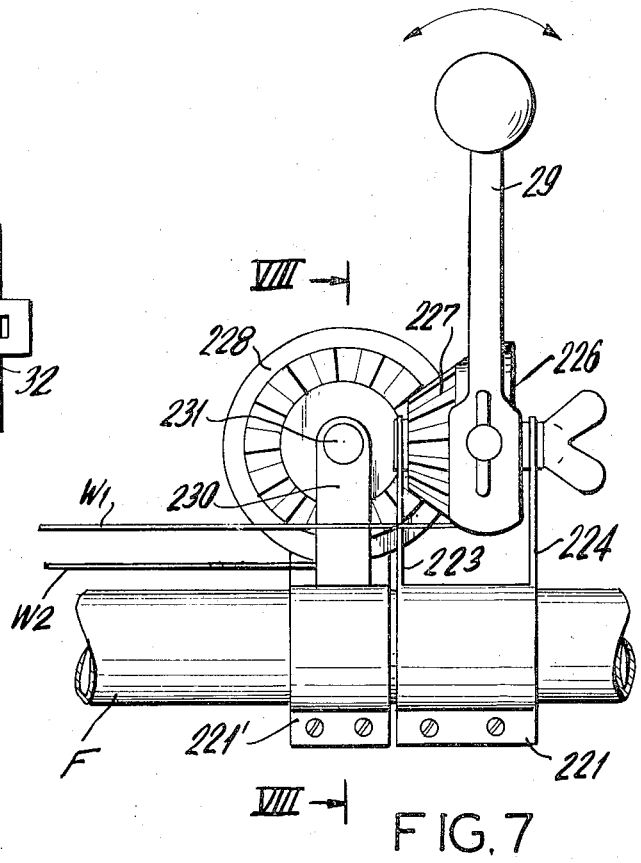
FIG. 6
FIG. 7

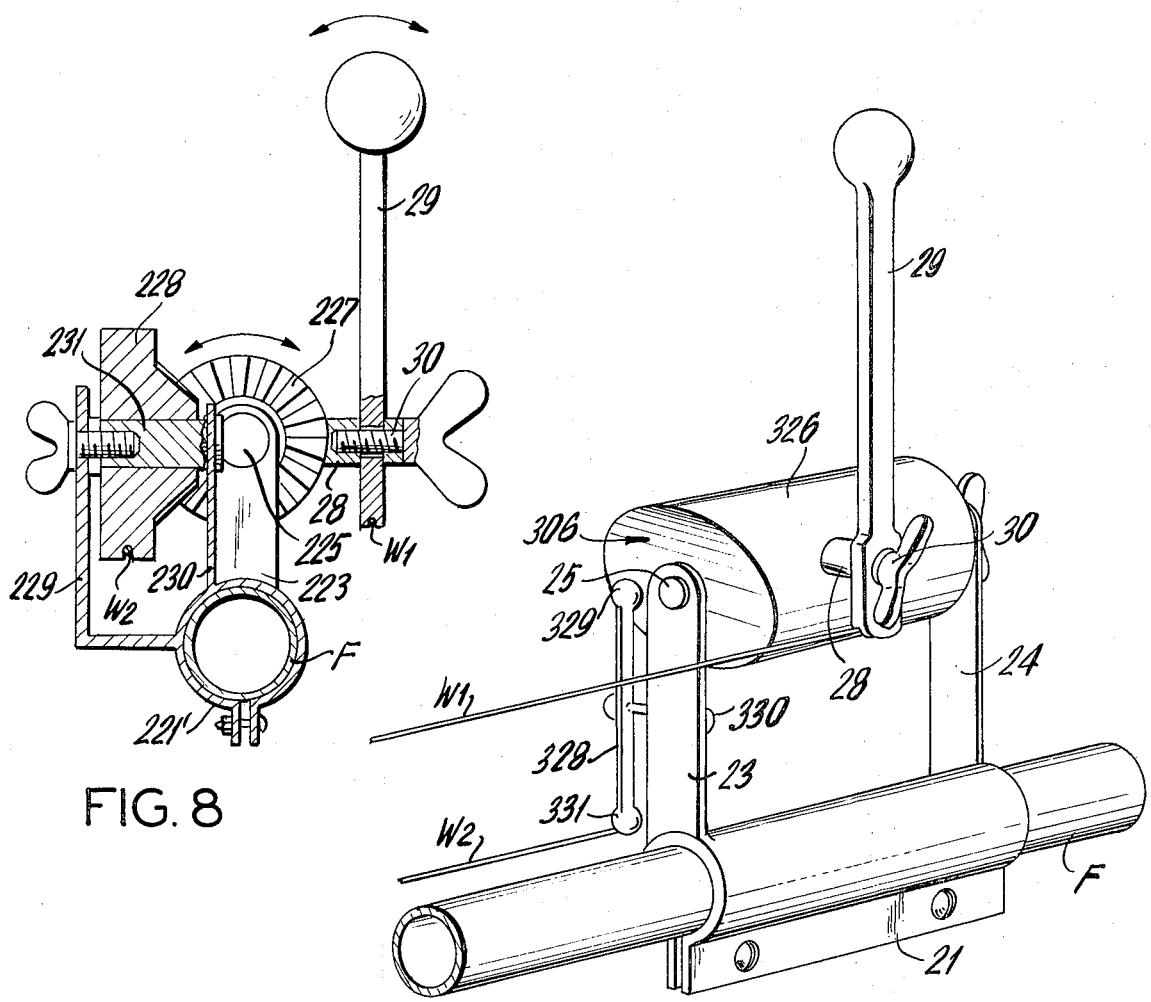
FIG. 8
FIG. 9
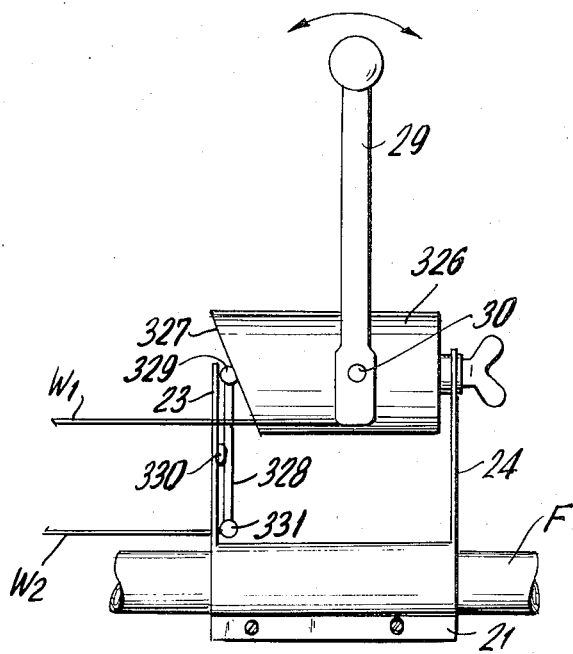
FIG. 10

3,808,907

SHIFT LEVER DEVICE FOR SPEED CHANGE GEAR TRANSMISSION TRAIN OF A BICYCLE

FIELD, BACKGROUND AND SUMMARY OF THE INVENTION

This invention relates to a lever device for shifting a speed change gear transmission train and, more particularly, to a device for shifting two sets of speed change gear transmission trains one set of which is mounted on the hub of the rear wheel of a bicycle and other set of which is mounted on a portion of the frame adjacent to the pedal driven sprocket.

Heretofore such a device consists of two levers or handles, one of which shifts the first speed change gear train and the other of which shifts the second change gear train, respectively. Accordingly, it is very difficult to manipulate both levers or handles at the same time, while riding the bicycle, and very troublesome to operate them.

It is accordingly one object of the present invention to provide an improved shift lever device for two sets of speed change gear transmission trains of a bicycle.

It is another object of the present invention to provide a lever device which is capable of shifting the first and second speed change gear transmission train simultaneously by manipulating only one handle or lever.

BRIEF DESCRIPTION OF THE DRAWINGS

Other objects and advantages of the invention will become apparent from the following description taken in connection with the accompanying drawings in which:

FIG. 4 is a sectional view taken in the direction of the arrows substantially along the line IV — IV of FIG. 3;

FIG. 5 shows a guide member of the first embodiment;

FIG. 6 is a schematic perspective view of a second embodiment of the shift lever device according to the invention;

FIG. 7 is a front elevation of the lever device of FIG. 6;

FIG. 8 is a schematic sectional view taken along the line VIII — VIII of FIG. 7;

FIG. 9 is a schematic perspective view of a third embodiment according to the invention;

FIG. 10 is a schematic elevation of the third embodiment of the shift lever device according to the invention;

DESCRIPTION OF THE PREFERRED EMBODIMENTS

Figure 1:
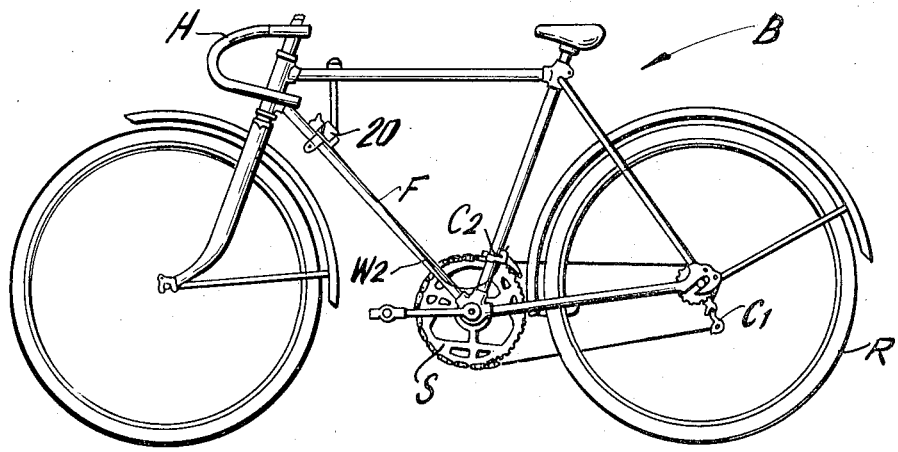
FIG. 1 is a general outline of a bicycle showing the location of the shift lever device according to the present invention as well as two sets of speed change gear trains.

Referring to FIG. 1, there is indicated a bicycle B having a shift lever device according to the present invention. The first set of speed change gear transmission trains $C_1$ is mounted on the hub of the rear wheel R and the second set of speed change gear transmission trains $C_2$ is mounted on a portion of the frame F adjacent to a sprocket wheel S. The shift lever device 20 is mounted on a portion of the frame F near the handle bars H, to be manipulated by a rider's hand. The device 20 is connected by means of conventional cables or wires $W_1$ and $W_2$ with the gear trains $C_1$ and $C_2$, respectively.

In an embodiment of the shift lever device shown in FIGS. 2, 3, 4 and 5, the device 20 includes a clamp or holding member 21 for mounting the device on the bicycle and a supporting member 22, of U-shape, is fixed to the holding member. A drum 26 is rotatably mounted on a shaft 25 which is journaled by upright arms 23 and 24 of the supporting member 22. There is a groove 27, which is slanted in the axial direction of the drum, in the cylindrical surface thereof. A projection or arm 28 is fixed to the drum 26 and a handle or lever 29 is mounted on the projection 28 so as to rotate about a set screw or bolt member 30. At the lower end of the lever 29, one end of the wire $W_1$ is fixed and other end of the wire $W_1$ is connected with the first speed change gear train $C_1$.

Figure 3:
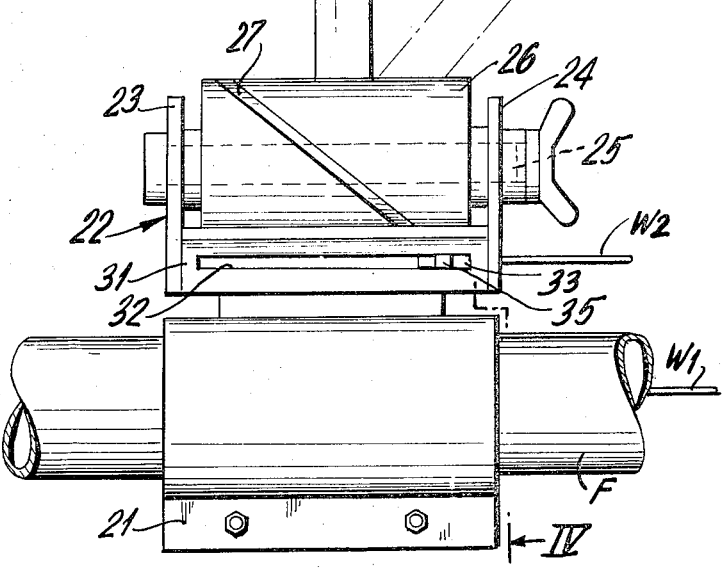
FIG. 3 is a front elevation of the lever device of FIG. 2.

As shown in FIGS. 3, 4 and 5, a guide member 31 is fixed to the holding member 21 in parallel with the longitudinal axis of the drum 26 at a short distance from the groove 27 in the drum 26. There is a longitudinal guide groove 32 in the member 31. Between the drum 26 and the guide member 31, a slide member 33 is provided. The slide member 31 has a pin or protrusion 34, engaged in groove 27 of drum 26; and a pin or protrusion 35, guided along the groove 32 in the member 31. One end of the cable or wire $W_2$ is fastened to the slide member 33 and other end of the wire $W_2$ is connected with the second change gear train $C_2$.

In operation, if the lever 29 is manipulated to move to a position shown in imaginary lines in FIG. 3, the wire $W_1$ actuates the first change gear transmission train $C_1$. On the other hand, if the lever 29 is moved to a position shown in imaginary lines in FIG. 4, the drum 25 rotates about the shaft 25 and the slide member 33 moves along the groove 32 in the guide member 31 by co-operation between the groove 27, provided in the drum 26 and the pin 34, and the wire $W_2$ is driven to shift the second speed change gear train $C_2$.

Referring to FIGS. 6, 7 and 8 which show a further embodiment of the shift lever device according to the present invention, the lever device includes a clamp or holding member 221 to be mounted on the portion of the frame F of the bicycle. Upright arm members 223 and 224 are fixed to respective ends of the holding member 221 and, on a shaft 225 which is journaled by the arm members, a drum 226 is mounted rotatably. To one end of the drum 226, a bevel gear 227 is fixed to rotate together with the drum. An arm 28 is fixed to the cylindrical surface of the drum 226 in the same way as the first embodiment shown in FIG. 2, and a lever 29 is mounted on the arm 28 so as to be rotated about a bolt member 30. To a lower end of the lever 29, one end of a wire $W_1$ is fixed while the other end of the wire is connected with the first change gear train $C_1$ as stated in the first embodiment.

In the second embodiment, shown in FIGS. 6, 7 and 8, a further bevel gear 228 is mounted on a shaft 231 which is journaled by upright arms 229 and 230 of a holding member 221' which is mounted on the frame F adjacent to the holding member 221. One end of the wire $W_2$ is fixed to a portion of the second bevel gear 228 and the other end of the wire $W_2$ is connected with the second gear train $C_2$. It will be appreciated that the holding members 221 and 221' may be united together to form a unitary body if desired.

In operation, when the lever 29 shown in FIGS. 6 to 8 is moved in either direction of the arrow shown in FIG. 7, the wire $W_1$ attatched to the lever 29 shifts the first speed change gear transmission train $C_1$. On the other hand, when the lever 29 is moved in either direction of the arrow shown in FIG. 8, the bevel gear 227 rotates together with the lever about the shaft 225 and the second bevel gear 228, which is engaged with the first bevel gear 227 rotates about the shaft 231 so that the wire $W_2$ is driven to shift the second speed change gear transmission train $C_2$.

FIGS. 9 and 10 show another embodiment of the shift lever device according to the invention and which includes a drum 326 mounted on a shaft 25 journaled by upright arms 23 and 24 of the clamp or holding member 21 to be mounted on a portion of the frame of the bicycle. An end surface 306 of the drum is formed as an inclined surface with respect to the longitudinal axis of the drum 326. In the same way as the first and second embodiments, a lever 29 is mounted on the drum 326 by means of the arm 28 and the bolt member 30 for rotation of the lever about the member 30 or to rotate the drum 326, together with the lever 29 about the shaft 25. A wire $W_1$ fastened to the lever 29, is connected with the first change gear transmission train $C_1$.

A rod member 328 is provided for engagement of one end thereof with the inclined cam surface 327 of the drum 326 by means of a pivot 330 mounted on the upright arm 23 of the holding member 21, and one end of the wire $W_2$ from the second speed change gear transmission train $C_2$ is fastened to the other end 331 of the rod 328.

In operation of the third embodiment, when the lever 29 is manipulated to move it in either direction of the arrow shown in FIG. 10, the wire $W_1$ is operated to shift the first speed change gear transmission train $C_1$. On the other hand, when the drum 326 is rotated about the shaft 25 by manipulating the lever 29, the end 329 of the rod member 328, which is pivotal on the pivot 30, is displaced by the inclined cam face 327 so that wire $W_2$ is shifted linearly to shift the second gear transmission train $C_2$ as desired.

Figure 11:
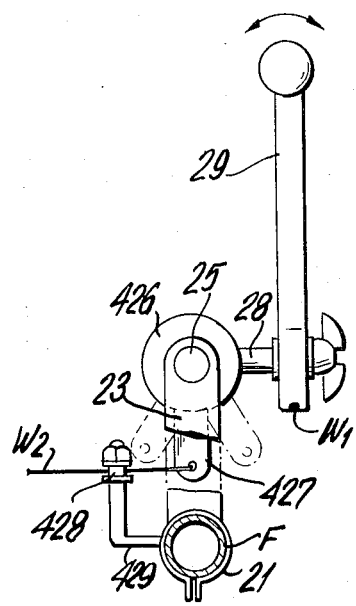
FIG. 11 is a schematic perspective view of a fourth embodiment of the shift lever device according to the invention.
Figure 12:
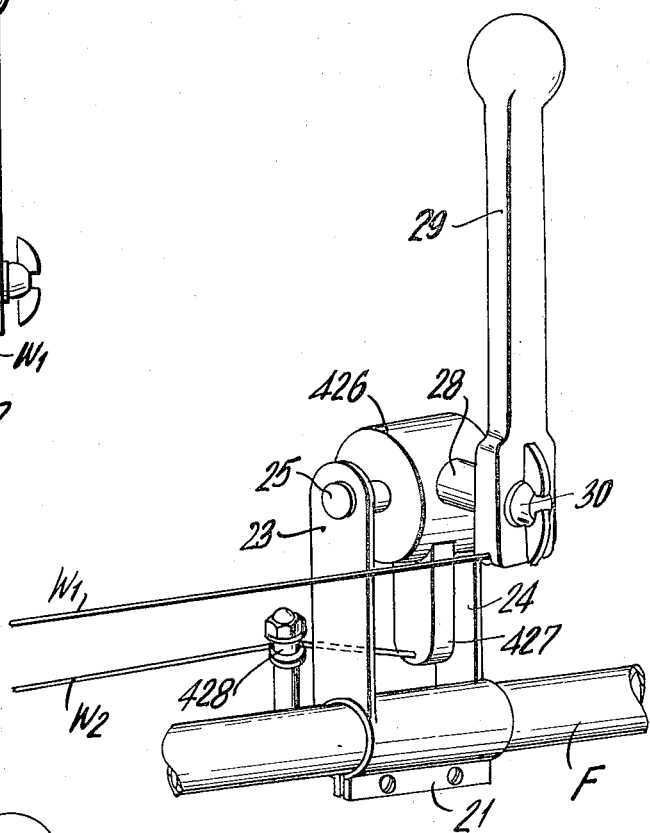
FIG. 12 is a side elevation of the embodiment shown in FIG. 11.

Referring to FIGS. 11 and 12, which show a further embodiment of the shift lever device according to the invention, the device includes a drum 426 mounted on a shaft 25 supported by the upright arms 23 and 24 of the holding member 21. In the same way as stated and illustlated with respect to the previous embodiments of the invention, the lever 29 is provided for driving the wire $W_1$ or rotating the drum 426 about the shaft 25. An arm 427 is fixed to the drum 426 to extend substantially at right angles to the member 28 and the wire $W_2$ from the second gear transmission train $C_2$ is fixed to a free end of the arm 427. It is preferable to provide a guide member 428, for the wire $W_2$, which may be an L-shape member 429 one end of which is fixed to the holding member 21.

In operation of the fourth embodiment shown in FIGS. 11 and 12, if the lever is manipulated to rotate it about the member 30, the wire $W_1$ is driven so that the first change gear transmission train $C_1$ is operated. On the other hand, if the drum 426 is rotated about the shaft 25 by manipulating the lever 29, the arm 427 is moved, and traction or slack of the wire $W_2$, depending upon the direction of the movement of the lever, acts on the second speed change gear transmission train $C_2$.

Figure 2:
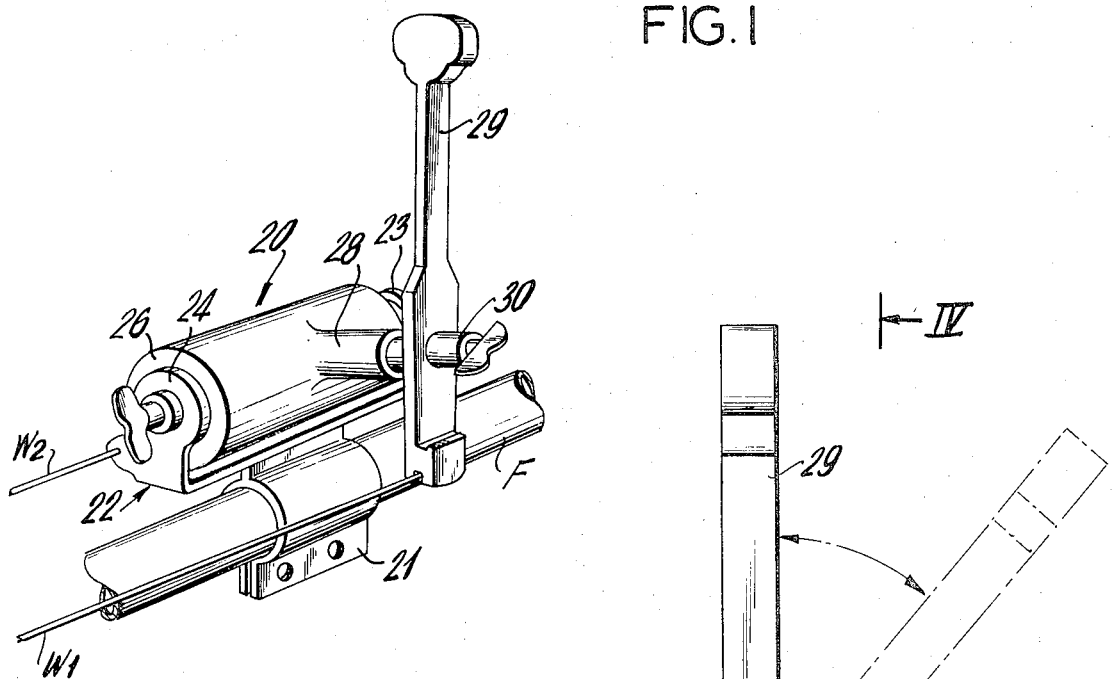
FIG. 2 is a schematic perspective view of a first embodiment of the shift lever device according to the invention.
Figure 13:
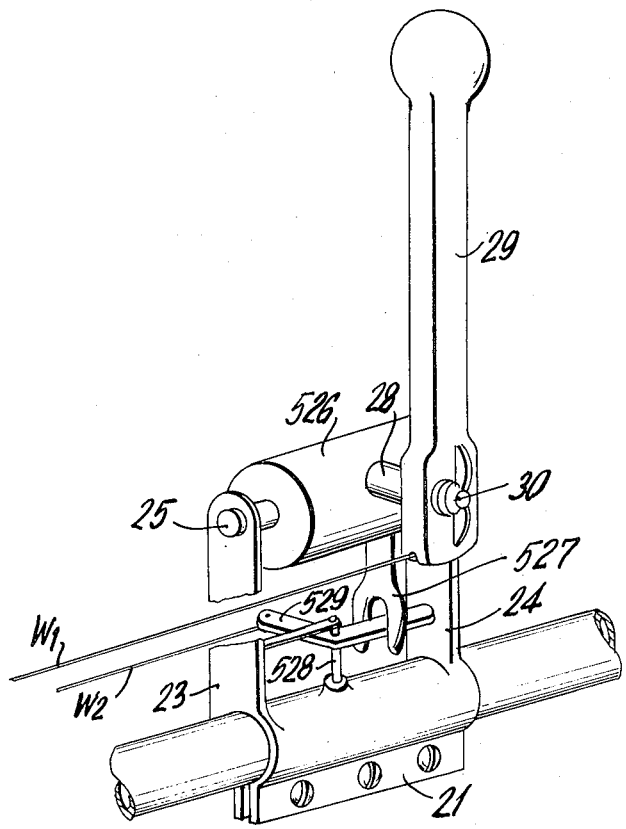
FIG. 13 is a schematic perspective view of a fifth embodiment of the shift lever device according to the invention.

Referring to FIG. 13 which shows another embodiment of the shift lever device according to the present invention, a drum 526 is mounted on a shaft 25 journaled by upright arms 23 and 24 of a holding member 21 in the same manner as the embodiment shown in FIG. 2. A fork member 527 is fixed to the drum 526 to extend at right angles with respect to the arm 28. An L-shape link 529 is pivoted at a pin 528 which is mounted on the holding member 21. One leg of the L-shape link 529 is inserted between the fingers of the fork member 527 and the other leg of the L-shape link is connected by means of the wire $W_2$ with the second change gear transmission $C_2$.

In operation of the above mentioned embodiment, if the lever 29 mounted on the drum 526 is manipulated and rotated about the bolt member 30, the wire $W_1$ shifts the first change gear transmission $C_1$, and if the drum 526 is rotated about to the shaft 25 by manipulating the lever 29, the wire $W_2$ shifts the second speed change gear transmission train $C_2$.

As will be evident from the aforegoing description, certain aspects of the invention are not limited to the particular details set forth in this specification. It is contemplated that various modifications will occur to those skilled in the art. For example, it is possible to connect the wire $W_1$ with the second change gear transmission train $C_2$, and to connect the wire $W_2$ with the first speed change gear transmission train $C_1$.

What is claimed is:

1. In a device for shifting first and second sets of speed change gear transmission trains, of a bicycle having a frame, and including a first speed changing cable connected at one end to the first train and a second speed changing cable connected at one end to the second train, an improved shift lever device comprising, in combination, a shift lever connected to the opposite end of said first cable and operatively mounted on siad frame for pivoting about a first axis, to effect linear movement of said first cable, and for angular displacement about a second axis perpendicular to said first axis; means connected to the opposite end of said second cable and operable by said shift lever, responsive to angular displacement of said shift lever, to effect linear movement of said second cable; said last-named means comprising a drum mounted rotatably on a shaft supported on a clamp secured to the bicycle frame; said shift lever being oscillatable on a pivot extending radially from said drum; said drum having a groove in its outer periphery extending at an angle to its axis; a slotted rectilinear guide adjacent and extending parallel to said drum; and a slide having a first projection engaged in said groove and a second projection engaged in said slide and connected to the opposite end of said second speed changing cable.

2. In a device for shifting first and second sets of speed change gear transmission trains, of a bicycle having a frame, and including a first speed changing cable connected at one end to the first train and a second speed changing cable connected at one end to the second train, an improved shift lever device comprising, in combination, a shift lever connected to the opposite end of said first cable and operatively mounted on said frame for pivoting about a first axis, to effect linear movement of said first cable, and for angular displacement about a second axis perpendicular to said first axis; means connected to the opposite end of said second cable and operable by said shift lever, responsive to angular displacement of said shift lever, to effect linear movement of said second cable; said last-named means comprising a drum mounted rotatably on a shaft supported on a clamp secured to the bicycle frame; said shift lever being oscillatable on a pivot extending radially from said drum; said drum having an inclined end surface; and an arm pivotally mounted on said frame intermediate its ends and having an end engaged with said inclined end surface at a point spaced from the axis of said drum; the opposite end of said arm being connected to said second speed changing cable.

3. In a device for shifting first and second sets of speed change gear transmission trains, of a bicycle having a frame, and including a first speed changing cable connected at one end to the first train and a second speed changing cable connected at one end to the second train, an improved shift lever device comprising, in combination, a shift lever connected to the opposite end of said first cable and operatively mounted on said frame for pivoting about a first axis, to effect linear movement of said first cable, and for angular displacement about a second axis perpendicular to said first axis; means connected to the opposite end of said second cable and operable by said shift lever, responsive to angular displacement of said shift lever, to effect linear movement of said second cable; said last-named means comprising a drum mounted rotatably on a shaft supported on a clamp secured to the bicycle frame; said shift lever being oscillatable on a pivot extending radially from said drum; a fork extending radially from said drum in angularly spaced relation to said pivot for said shift lever; and a bell crank pivotally mounted on said frame and having a first arm embraced by said fork and a second arm connected to the opposite end of said second speed changing cable.

4. In a device for shifting first and second sets of speed change gear transmission trains, of a bicycle having a frame, and including a first speed changing cable connected at one end to the first train and a second speed changing cable connected at one end to the second train, an improved shift lever device comprising, in combination, a shift lever connected to the opposite end of said first cable and operatively mounted on said frame for pivoting about a first axis, to effect linear movement of said first cable, and for angular displacement about a second axis perpendicular to said first axis; means connected to the opposite end of said second cable and operable by said shift lever, responsive to angular displacement of said shift lever, to effect linear movement of said second cable; said last-named means comprising a first bevel gear rotatably mounted on the shaft supported on the clamp secured to the frame of the bicycle; said shift lever being oscillatable on a pivot extending radially from said bevel gear; and a second bevel gear meshing with said first-mentioned bevel gear and mounted on the frame of the bicycle for rotation about an axis perpendicular to the axis of rotation of said first-mentioned bevel gear; the opposite end of said second speed changing cable being connected to the periphery of said second bevel gear.

* * * * *